July 14, 1936.  C. W. BRABENDER  2,047,765
APPARATUS FOR THE DETERMINATION OF MOISTURE
Filed Nov. 1, 1935

Carl Willy Brabender

UNITED STATES PATENT OFFICE 2,047,765

APPARATUS FOR THE DETERMINATION OF MOISTURE

Carl Willy Brabender, Duisburg, Germany

Application November 1, 1935, Serial No. 47,874
In Germany February 22, 1934

10 Claims. (Cl. 73—51)

My invention relates to an apparatus for determining the percentage of moisture contained in food-stuffs, fatty, oleaginous products, wood and coal, crystals and chemicals, raw and unfinished products and the like, in which apparatus the loss of weight resulting from the expulsion of the moisture from said substances is determined by means of a weighing device arranged outside of the oven.

The object of my invention is to provide an apparatus for determining the percentage of moisture contained in the above-mentioned substances, whereby a plurality of substances to be tested may be examined with the aid of a single weighing device in a simple and speedy manner. This object may be accomplished by arranging within a drying oven a rotatably mounted grate-like tray having holes arranged at the periphery thereof to support a plurality of pans or dishes for the reception of material, e. g., flour or cereals. The weighing device arranged outside of the oven is designed in such a manner that a vertically movable steelyard extends through the holes of the revolving tray arranged in the bottom of the oven, and engages the pans or dishes for the reception of the substances to be tested. In this manner, it is possible to weigh during the heating in the shortest possible time a plurality of samples of substances, e. g., flour and cereals one after the other by means of a weighing device, since only the grate-like tray with the individual pans must be moved by one position, in order that each single pan engages the steelyard.

The principle of the apparatus according to the present invention is based upon the fact that the tared pans are filled with a predetermined amount of the product to be tested and after heating are weighed and the percentage of moisture, when the product is dried may be read off on a scale.

In the accompanying drawing an embodiment of my invention is shown in a diagrammatic form.

Figure 1:
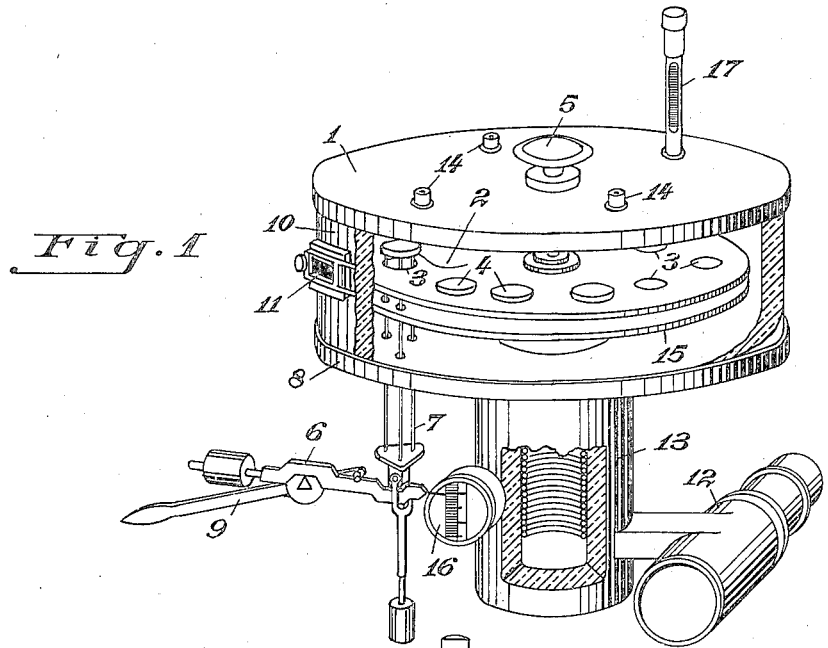
Figure 2:
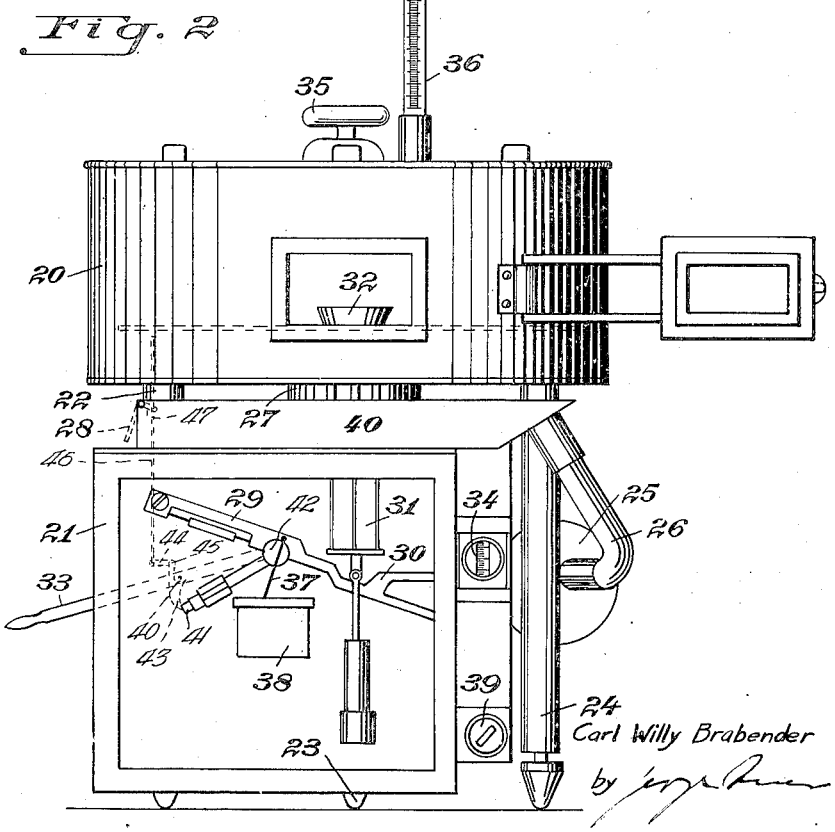

Fig. 1 shows a perspective view partly in section and Fig. 2 a front elevational view of the apparatus according to the invention.

Referring to Fig. 1 the cylindrical oven 1 is provided inside with a rotatably mounted disk-like tray 2, which carries pans or dishes 4 supported in corresponding openings 3. In these pans a predetermined quantity of the food-stuff to be tested such as, for instance, flour is weighed on a preliminary balance. A plurality of such pans 4 are arranged peripherally on the revolving disk 2 located inside the oven 1. By further rotating the disk 2, which is effected outside the oven 1, by means of a hand wheel 5 the individual pans 4 may be brought into the corresponding position within the oven.

A weighing device the steelyard of which carries a number 7 provided with a pending counterweight is placed below the oven 1. The part 7 may pass through the bottom 8 of the oven and through the holes 3 of the disk-like tray 2 so as to support the pans 4 and may be arranged in such a manner as to be raised and lowered. To this end, the steelyard may be released by the lever 9. Member 7 which comprises substantially three perpendicular rods is then adapted to engage the pan placed on the corresponding hole. By raising the lever 9 the member 7 is moved in the downward direction so that the disk-like tray 2 may be rotated at any desired position. Consequently, by raising and lowering the member 7 and by rotating the tray 2 by means of the hand wheel 5 the pans can be weighed one after the other.

In Fig. 1 the apparatus is shown during the weighing process.

Through the window 11 arranged in the wall 10 of the oven the adjustment of the revolving tray 2 may be observed, i. e., the individual pans 4 may be adjusted one after the other above the lever system 7 of the weighing device in order to determine the weight of all pans by the weighing device. A fan 12 slowly drives air through an electrical heating resistance 13 into the oven 1 the temperature of which is kept constant by a thermo-regulator 17. A disk 15 is arranged below the revolving tray 2 to effect a uniform distribution of heat within the chamber of the oven. The hot air dries the material, e. g., flour and at the same time forces the moisture absorbed into the atmosphere through the nozzles 14. The loss of weight resulting during the heating process in the oven and which corresponds to the moisture of the food-stuff to be tested is indicated in percentage on an illuminated scale 16.

Fig. 2 shows a front elevational view of the complete apparatus. The cylindrical drying oven is indicated by numeral 20. It is provided with a weighing device 21 supported on three columns 22, 23, 24. An air chamber 40 is arranged between the weighing device 21 and the drying oven 20 through which chamber the air is drawn by the ventilator 25 through the conduit 26 so as to supply the air to the drying oven 20 through the heating resistance 27. The weighing device 21 is preferably heat insulated by the air chamber 40 against the drying oven 20 lying thereabove. The air chamber 40 is provided with an air vent 28, by means of which the air chamber is closed during the weighing process in order to prevent the balance from being influenced by external air currents. The weighing device 21 comprises the steelyard 29 which at the right side thereof as indicated at 30 has a member 31 consisting in this embodiment of three rods which project into the drying oven 20 so as to support the pans such as 32 arranged on the revolving tray. By operating the lever 33 the weighing device is released and the lever system 31 is raised so that the latter engages the corresponding pan, e. g., the pan 32 arranged in the oven. The air vent 28 is at the same time closed and a locking device is actuated which prevents a further rotation of the disk-like tray within the oven 20 during the weighing process so that a damaging of the three rods of the portion 31 may not occur. By means of the right-hand part of the steelyard 30 the moisture is read in percentage directly on the illuminated scale 34.

The device for locking the pan-carrying tray within the oven against rotation and for closing the air vent during the weighing process responsive to the actuation of the operating lever 33, as described above, is diagrammatically indicated in Fig. 2. Secured to the shaft 42 is an arm carrying at its end a member 41 adapted to actuate a cam pawl or locking pawl 43 which is pivotally mounted at 45 and carries an arm 44. Co-operatively secured to the latter is a rod-like member 46 which projects into the oven 20 and is adapted to engage with its upper end the pan-carrying tray indicated in dotted lines. Linked to the rod 46 is the air vent 28, as indicated at 47. If the locking pawl 43 with its arm 44 is rotated in clockwise direction, the rod 46 will be moved upwardly with its end into engagement with the pan-carrying tray and will lock the tray against inadvertent rotation. The link 47 will at the same time actuate the air vent 28 and will close it as previously described. The apparatus will then be in weighing position with the member 31 supporting a pan, such as the pan 32, for weighing. The proper rotation of the locking pawl 43 and its arm 44 is brought about by the rotation of the member 41 against the cam surface of the pawl 43 responsive to the actuation of the lever 33, that is, upon the raising of the steel yard 29. The pin 40 on the lever 33 will then engage the pawl above its cam portion 43 as shown. The end of the rod 46 will engage the pan-carrying tray and lock it against accidental rotation and the air vent 28 will be closed. The weighing device can now function to weigh the pan on the member 31 without any detrimental outside influence. After the weighing is concluded the lever 33 will be actuated again to lower the steel yard 29 and member 41 will ride on the cam surface of the locking pawl in anti-clockwise direction to remove the locking rod from contact with the tray in the oven and to open the air vent 28 again preparatory to positioning the pan-carrying tray with another pan in alignment with member 31 of the weighing device.

The adjustment of the pans 32 above the lever system 31 is effected by the hand wheel 35 which may be operated only when the lever system 31 is not raised. The thermo-regulator 36 maintains the temperature at a desired value.

The weighing device 21 is provided with a damping vane 37 which moves in an oil-filled vessel 38. The switch 39 serves to connect or disconnect the fan 25, the heating resistance 27 and the illumination of the scale 34.

I claim as my invention:

1. An apparatus for determining the moisture content of substances, comprising in combination an oven, a revolving tray in said oven provided with holes adapted to support a plurality of pans for the reception of the substances to be tested, and a weighing device having means adapted to engage said pans selectively to weigh within the oven the pans supported on the holes arranged in the tray.

2. An apparatus for determining the moisture content of substances, comprising in combination an oven, a revolving tray in said oven provided with holes adapted to support a plurality of pans for the reception of the substances to be tested, and a weighing device with a raising and lowering weighing portion projecting into the oven, said portion passing through the holes arranged in the revolving tray and being adapted to weigh within the oven successively all pans arranged on the tray.

3. An apparatus for determining the moisture content of substances, comprising in combination an oven, a revolving tray in said oven provided with holes adapted to support a plurality of pans for the reception of the substances to be tested, a weighing device having a steelyard with a multi-armed support arranged to be pushed in an upward direction into the holes of the tray to selectively engage and support the pans with the substance during the weighing process.

4. An apparatus for determining the moisture content of substances, comprising in combination an oven, a revolving tray in said oven provided with holes adapted to support a plurality of pans for the reception of the substances to be tested, a weighing device having a steelyard an arm of which carries a multi-armed support and a sidewise lying lever adapted when lowered to raise the multi-armed support into the oven through the holes of the tray selectively for engaging the pans with the substance during the weighing process.

5. An apparatus for determining the moisture content of substances, comprising in combination an oven, a revolving tray in said oven provided with holes adapted to support a plurality of pans for the reception of the substances to be tested, a weighing device having an upwardly-extending multiarmed support adapted to engage said pans selectively to weigh within the oven the pans supported on the holes arranged on the tray, a transparent door in the wall of the oven for observing the rotation of the tray, and means for rotating the tray from the outside so as to adjust the pans above the upwardly extending multi-armed support of the weighing device.

6. An apparatus for determining the moisture content of substances comprising in combination, a cylindrical drying oven heated by a current of hot air produced by a fan and a heating resistance, a temperature control device, a disk-like tray rotatable about an axis passing through the center of the oven cover and having peripherally arranged holes in the tray for a plurality of pans for the reception of said substances, a weighing device with a raising and lowering steelyard arranged below the oven having a multi-armed support adapted to be moved into the oven in the upward direction and an electrical heating resistance arranged on the same axis below the oven, the air for heating the drying chamber being forced through said heating resistance by means of said fan.

7. An apparatus for determining the moisture content of substances, comprising in combination an oven, a revolving tray in said oven provided with holes adapted to support a plurality of pans for the reception of the substances to be tested, a weighing device having a multi-armed support adapted to engage said pans selectively to weigh within the oven the pans supported on the holes arranged in the tray, and a locking device associated with the weighing device adapted to release the weighing device only when the pans are above the multi-armed support.

8. An apparatus for determining the moisture content of substances, comprising in combination an oven, a revolving tray in said oven provided with holes adapted to support a plurality of pans for the reception of the substances to be tested, a weighing device having a multi-armed support adapted to engage said pans selectively to weigh within the oven the pans supported on the holes arranged in the tray, and a locking device associated with the weighing device adapted to prevent a rotation of the tray when the multi-armed support is moved in the upward direction into the chamber of the oven.

9. An apparatus for determining the moisture content of substances, comprising in combination an oven having a drying chamber, a revolving tray in said oven provided with holes adapted to support a plurality of pans for the reception of the substances to be tested, a weighing device adapted to weigh within the oven the pans supported on the holes arranged in the tray, an air chamber arranged between the weighing device and the drying chamber, means for drawing through said air chamber a current of air, said air chamber being provided to heat insulate the weighing device from the drying chamber.

10. An apparatus for determining the moisture content of substances, comprising in combination an oven, a revolving tray in said oven provided with holes adapted to support a plurality of pans for the reception of the substances to be tested, a weighing device, an air chamber having an air vent arranged between the weighing device and the oven, a lever connected with the weighing device and the air vent of the air chamber and being adapted to bring the weighing device into engagement with the pans within the oven and to simultaneously close the air vent so as to prevent the weighing device from being influenced by the outside atmosphere.

CARL WILLY BRABENDER.